(12) United States Patent
Dai

(10) Patent No.: US 8,300,631 B2
(45) Date of Patent: Oct. 30, 2012

(54) METHOD FOR REALIZING MOBILE IP MANAGEMENT AND THE NETWORK SYSTEM THEREOF

(75) Inventor: Xianfeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1050 days.

(21) Appl. No.: 12/163,694

(22) Filed: Jun. 27, 2008

(65) Prior Publication Data

US 2008/0259850 A1 Oct. 23, 2008

Related U.S. Application Data

(63) Continuation of application No. PCT/CN2006/002557, filed on Sep. 28, 2006.

(30) Foreign Application Priority Data

Dec. 28, 2005 (CN) .......................... 2005 1 0135426
Feb. 23, 2006 (CN) .......................... 2006 1 0057701

(51) Int. Cl.
*H04W 4/00* (2009.01)
*H04J 3/24* (2006.01)
*H04L 12/66* (2006.01)
*H04L 12/28* (2006.01)
*H04L 12/56* (2006.01)

(52) U.S. Cl. ........ 370/352; 370/328; 370/329; 370/331; 370/349; 370/389

(58) Field of Classification Search ................... 370/328
See application file for complete search history.

(56) References Cited

U.S. PATENT DOCUMENTS

| 6,578,085 | B1 * | 6/2003 | Khalil et al. .................. 709/241 |
| 6,910,074 | B1 * | 6/2005 | Amin et al. .................... 709/227 |
| 7,483,697 | B2 * | 1/2009 | Ohki .......................... 455/432.1 |
| 2002/0006133 | A1 | 1/2002 | Kakemizu et al. |

(Continued)

FOREIGN PATENT DOCUMENTS

CN 1558693 A 12/2004

(Continued)

OTHER PUBLICATIONS

Mizuno et al., "Mobile IP Border Gateway (MBG)," *IETF Internet Working Draft*, 1: 1-18 (Oct. 2002) http://draft-ohnishi-mobileip-mbg-01.txt.

(Continued)

*Primary Examiner* — Faruk Hamza
*Assistant Examiner* — Diane Lo
(74) *Attorney, Agent, or Firm* — Leydig, Voit & Mayer, Ltd.

(57) ABSTRACT

A method for realizing mobile IP management includes: a mobile node (MN) sends a mobility registration signal to a mobility control (MC) entity in a control function entity of the transmission layer of the network; a home mobility control entity of the mobile node registers the mobile node, returns a registration response to the mobile node and transmits a control signal to a mobility forwarding (MF) entity in the transmission layer; the mobility control entity controls the mobility forwarding entity to provide communication services for the mobile node after it receives a request signal from the registered mobile node. A method for realizing mobile IP management in NGN network and a network system for realizing mobile IP management are also disclosed.

26 Claims, 11 Drawing Sheets

U.S. PATENT DOCUMENTS

| | | | |
|---|---|---|---|
| 2002/0021680 A1* | 2/2002 | Chen | 370/331 |
| 2004/0085925 A1 | 5/2004 | Longoni et al. | |
| 2004/0240393 A1 | 12/2004 | Nishida et al. | |
| 2005/0053054 A1* | 3/2005 | Das et al. | 370/352 |
| 2011/0007742 A1* | 1/2011 | Leung et al. | 370/389 |

FOREIGN PATENT DOCUMENTS

| | | |
|---|---|---|
| CN | 1620829 A | 5/2005 |
| CN | 100563163 C | 11/2009 |
| EP | 1 450 543 A2 | 8/2004 |
| JP | 2001-258058 A | 9/2001 |

OTHER PUBLICATIONS

Yang et al., "Forwarding and Control Element Separation (ForCES) Framework," *IETF Standard (Informational)*, 1-40 (Apr. 2004) http://rfc3746.txt.

European Patent Office, Examination Report in European Application No. 06791144.6 (Apr. 26, 2010).

Written Opinion of the International Searching Authority in corresponding PCT Application No. PCT/CN2006/002557 (Feb. 8, 2007).

"Y.2011—General principles and general reference model for Next Generation Networks," Series Y: Global Information Infrastructure, Internet Protocol Aspects and Next Generation Networks; Oct. 2004, International Telecommunication Union, Geneva, Switzerland.

"NGN FG Proceedings Part II," Next Generation Network—Global Standards Initiative, 2005, International Telecommunication Union, Geneva, Switzerland.

Johnson et al., "Mobility Support in IPv6," Jun. 2004, The Internet Society, Reston, Virginia.

Arkko et al., "Using IPsec to Protect Mobile IPv6 Signaling Between Mobile Nodes and Home Agents," Jun. 2004, The Internet Society, Reston, Virginia.

Koodli, "Fast Handovers for Mobile IPv6," Jul. 2005, The Internet Society, Reston, Virginia.

Soliman et al., "Hierarchical Mobile IPv6 Mobility Management (HMIPv6)," Aug. 2005, The Internet Society, Reston, Virginia.

"COM 13—D 312—E—FGNGN-FRA Version 7.1 (Ref.: FGNGN-OD-00244R2)," Study Group 13—Delayed Contribution 312, Jan. 16-27, 2006, International Telecommunication Union, Geneva, Switzerland.

"COM 13—D 313—E—Mobility Management Capability Requirements for NGN (Ref.: FGNGN-OD-00246r1)," Jan. 16-27, 2006, International Telecommunication Union, Geneva, Switzerland.

Knightson et al., "NGN Architecture: Generic Principles, Functional Architecture, and Implementation," IEEE Communications Magazine, Oct. 2005, Institute of Electrical and Electronics Engineers, Inc., New York, New York.

Summons to Attend Oral Proceedings in corresponding European Application No. 06791144.6 (Mar. 28, 2011).

Extended European Search Report in corresponding European Application No. 11186661.2 (Jan. 12, 2012).

* cited by examiner

METHOD FOR REALIZING MOBILE IP MANAGEMENT AND THE NETWORK SYSTEM THEREOF

CROSS-REFERENCE TO RELATED APPLICATIONS

This application is a continuation of International Patent Application No. PCT/CN2006/002557, filed Sep. 28, 2006, which claims priority to Chinese Patent Application No. 200510135426.9, filed Dec. 28, 2005, and Chinese Patent Application No. 200610057701.4, filed Feb. 23, 2006, all of which are hereby incorporated by reference in their entirety.

FIELD OF THE INVENTION

The present invention relates to mobile communication technology, and in particular, to a method for realizing mobile IP management and a network system thereof.

BACKGROUND

Because Internet has good communication capability, mass information storage and acquisition capability, the IP technology, as the supporting technology for constructing Internet, becomes such a common network technology that various related and unrelated networks are to employ IP technology or to be compatible with it. Based on the IP technology, a technology known as mobile IP is proposed to address the need of maintaining service continuity while a mobile node (MN) is in roaming. As Internet develops rapidly, IP addresses are becoming badly needed and will soon be used up. IPv6 is developed on the basis of current IP technology (IPv4) to address this problem; corresponding mobile IP technology also evolves from MIP4 to MIP6 (Mobile IPv6). The fundamental principle of MIP6 is shown in FIG. 1:

(1) An MN operates in the same manner as other fixed nodes when it is connected to its home network.

(2) The MN detects whether it is roaming into a foreign network by the neighbor discovery mechanism of IPv6. Foreign gateways of IPv6 periodically transmit router advertisement messages including the prefix of the foreign network, and after receiving the router advertisement messages from the foreign gateway, the MN determines that it has roamed into a foreign network if it finds that the prefix of the foreign network therein is different from that of the home network.

If the MN finds that it has moved into a foreign network, it acquires a care-of-address in the foreign network through a stateful or stateless automatic address configuration process on the basis of the received router advertisement message. Now the MN has both a home address and a care-of address.

(4) The MN registers its care-of address with a home agent by a "binding update" message.

(5) The MN can also notify its correspondent node (CN) of its care-of address by a "binding update" message registration. Before the registration, a Return Routability Test Procedure should be performed between the MN and the CN, i.e. the MN first sends a Home Init Test message and a Care-of Init Test message to the CN and the CN returns a Home Test message and a Care-of Test message to the MN after processing.

(6) If the CN does not know the care-of address of the MN, it will transmit packets to the MN's home network according to the MN's home address, then the home agent of the MN will intercept the packets and forward the packets to the MN by tunneling mechanism according to current care-of address of the MN.

Packets transmitted to the CN by the MN are also transmitted to the home agent by a reverse tunnel and then forwarded to the CN by the home agent. This is also called a "triangle routing" because all packets transmitted between the CN and the MN need to be forwarded by the home agent in this manner.

(7) If the CN knows the care-of address of the MN through the "binding update", it will transmit packets directly to the MN by use of a route header of IPv6. Because a first destination address of the packets is the care-of address and a second destination address is the home address, the packets are transmitted directly to the MN in the foreign network without being forwarded by the home agent.

In a reverse direction, packets transmitted by the MN to the CN have the care-of address as the source address and the home address stored in the destination extension header of the packets. Thus, the packets can also be directly transmitted to the CN instead of being transmitted to the home agent through the reverse tunnel. This is called a "route optimization" corresponding to the "triangle route" in (6).

As 2.5G/3G wireless network and broadband IP network are applied popularly, a next generation network (NGN) is proposed, which is expected to be compatible with all existing networks, be capable of carrying all service media, provide good interface and extension capability for new service improvements and ensure ubiquity, security and good quality of service (QoS) of communication.

The fundamental architecture model of the NGN network is shown in FIG. 2 and the entire network model is divided into a service plane and a transmission plane. The transmission plane is subdivided into 4 functional parts: network access control function, resource admission control function, access network function and core transmission function. The network access control function includes an MN database, an authentication and authorization function entity, a network access configuration control function entity and a location management function entity, and the resource admission control function includes a policy determining function entity, an access resource control function entity and a core transmission resource control function entity.

An MN is connected to the NGN network through an access network and controlled by the network access control function. In the network access control function, the authentication and authorization function entity inquires the MN database for authentication and authorization of the MN, and after authentication and authorization of the MN is passed, the network access configuration control entity configures the MN's network characteristics (e.g., IP, DNS, gateway etc.); the location management function entity collects the MN's location information and transmits it to a control entity related to the service plane.

The resource admission control function receives a resource scheduling request from the service plane and resolves the request into access network resource request and core network resource request by the policy determining function entity. The access network resource control entity and the core transmission network resource control entity resolve the respective requests into actual network resources bandwidth representation respectively and deliver them to related entities in the access network and the core network.

The access network and the core network may enable/disable terminal transmission function for MNs after receiving control requests from the network access control function (NACF) and the resource admission control function (RACF).

There is no support for mobility management in the existing NGN architecture model; while the current MIP6 technology is a technology developed mainly for solving mobility issue for Internet and not for broad requirements of hierarchical network such as the NGN network; therefore the existing MIP6 technology has the following disadvantages:

1. Because the control function and the forwarding function are not separated, all packets are processed in one plane, which is not suitable for hierarchical network architecture like the NGN network; and the management pattern and control pattern can not meet requirements of hierarchical network and hence not meet the development trend toward layered management of future network.

2. Lacking the cooperation capability among multiple mobility control agencies, which only satisfies the requirements of local network mobility IP management and does not satisfy requirements of mobility IP management of large complex network.

3. Incompatible with operation mode of MIPv4.

4. Insufficient use of mobility management capability of the network the CN resides and the route optimization manner being unable to ensure the privacy of MN's address.

SUMMARY

The present invention provides a method and network system for realizing mobile IP management to address the problem that the existing mobile IP management can not apply in a network of layered architecture well and can not apply in large complex network because control function and forwarding control function are not separated. Further, the present invention addresses the problem that the existing NGN network does not support mobility management.

A network system for realizing mobile IP management includes a control function entity and a forwarding function entity of a transmission layer. The forwarding function entity performs service forwarding under the control of the control function entity. The control function entity of the transmission layer includes a mobility control entity and the forwarding function entity includes a mobility forwarding entity. The mobility control entity is configured to process signal sent from a mobile node and transmit a processing result to the mobility forwarding entity. The mobility forwarding entity is configured to encapsulate/deencapsulate and forward mobile service related packets under the control of the mobility control entity.

According to the above network system:

The control function entity of the transmission layer further includes a mobility authentication and authorization entity configured to implement authorization, authentication and accounting for a mobile node based on a request from the mobility control entity.

The mobility control entity and the mobility forwarding entity are logical entities independent from each other.

The mobility control entity and the mobility forwarding entity are arranged in one and the same physical entity, the mobility control entity and the mobility forwarding entity are included in other different entities; or the mobility control entity and the mobility forwarding entity are physical entities independent from each other.

One mobility control entity is connected to a plurality of mobility forwarding entities directly or remotely and controls the plurality of mobility forwarding entities.

There are a plurality of mobility control entities interconnected or a plurality of mobility control entities that are cascaded.

The network system is an NGN network system.

In the NGN network system, the mobility forwarding entity is further connected to an access network resource control entity in the control function entity of the transmission layer, and the access network resource control entity provides resource control for the mobility forwarding entity.

In the NGN network system, the mobility forwarding entity is arranged in an access network of the transmission layer; or the mobility forwarding entity is arranged in a core network of the transmission layer and located at an edge of the core network.

In the NGN network system, the mobility forwarding entity is arranged in an access network and a core network of the transmission layer respectively. The mobility forwarding entity arranged in the access network is connected to an access resource control entity in the control function entity of the transmission layer and the access resource control entity provides resource control for the mobility forwarding entity in combination with the mobility control entity. The mobility forwarding entity arranged in the core network is connected to a core network resource control entity in the control function entity of the transmission layer and the core network resource control entity provides resource control for the mobility forwarding entity in combination with the mobility control entity.

A method for realizing mobile IP management includes:

sending, by a mobile node, a mobiltiy registration signal to a mobility control (MC) entity in a control function entity of a transmission layer of a network;

registering a mobile node, returning a registration response to the mobile node and transmitting a control signal to a mobility forwarding (MF) entity in the transmission layer by a home mobility control entity of the mobile node; and controling the mobility forwarding entity by the mobility control entity after the mobility control entity receives a request signal from the mobile node, to provide communication services for the mobile node.

According to the above method:

Transmiting an authentication request to a home mobility authentication and authorization entity by the home mobility control entity after the home mobility control entity receives the mobility registration signal; and authenticating the mobile node and returning a authentication result to the mobility control entity by the mobility authentication and authorization entity.

Transmitting directly the sent registration signal to the home mobility control entity when the mobile node is in a foreign network, or transmitting the sent registration signal to the home mobility control entity via a foreign mobility control entity of a foreign network where the mobile node resides when the mobile node is in the foreign network.

Acquiring automatically a nearby foreign mobility forwarding entity and further acquiring an address of a foreign mobility control entity based on the nearby foreign mobility forwarding entity by the mobile node when the mobile node is registered in a foreign network.

Acquiring a care-of address from the foreign network by the mobile node prior to sending a mobility registration signal when the mobile node switches registration, and carrying the care-of address in the mobility registration signal.

Further acquiring information on quality of service of the mobile node and applying the information to service control by the mobility control entity during the switching.

Further transmitting a route optimization request to a correspondent node by the mobile node after the mobile node completes the switching and establishing an optimized communication channel with the correspondent node by the mobile node after the mobile node receives a route optimization response.

Transmitting a route optimization request to a home mobility control entity by the mobile node after the mobile node completes the switching and transmitting the route optimization request to a mobility control entity in which the correspondent node resides after the route optimization request is approved; and establishing an optimized communication channel by the mobile node after the mobile node receives a route optimization response and forwarding packets by a mobility forwarding entity in which the correspondent node resides.

Processing the care-of address of the mobile node in the packets sent by the mobile node by the mobility forwarding entity in which the correspondent node resides after the mobility forwarding entity receives the packets, to protect privacy of the location of the mobile node.

A method for realizing mobility management in an NGN network system, includes:

transmitting a registration message to the NGN network by a mobile node, and registering the mobile node and returning a registration response to the mobile node by a function entity for registration in the NGN network;

transmitting a mobile registration message to the NGN network by the mobile node after the mobile node receives a registration success response, and registering the mobile node and returning a registration response to the mobile node by a home function entity for mobility management of the mobile node in the NGN network; and providing corresponding communication services base on a request from the mobile node by the function entity for mobility management in the NGN network after the mobility registration of the mobile node is successful.

The function entity for registration in the NGN network further authenticates the mobile node requesting for registration based on mobile node data; or/and the function entity for mobility management further implements mobility authentication for the mobile node based on the mobile node data.

Beneficial effects of the present invention are as follows:

1. The present invention creatively proposes how to realize a mobile IP management model in a hierarchical network and an overall architecture according to the existing mobile IP technology in conjunction with the development trend toward layered management model of future networks. This solution not only is compatible with existing mobile IP technology, but also improves the overall implementation solution on the basis of the same, satisfies various mobility management requirements, and creatively integrates multiple route optimization solutions, address privacy and authorization and authentication functions.

2. According to the present invention, MIP6 technology is incorporated into the NGN network, which enables the NGN network to have a capability of supporting long-range mobile communication and long-range seamless switching, and meanwhile provide the MIP6 technology with a feature of separated control and forwarding functions of NGN network, and forwarding and control interfaces provided have good quality of service (QoS) capability and security feature.

DETAILED DESCRIPTION

In order to better implement MN mobility management in complex hierarchical control network, in the present invention, on the basis of existed mobile IP technology, the mobility management function entity is separated into a mobility control (MC) entity and a mobility forwarding (MF) entity so as to apply mobile IP management in hierarchical control networks similar to the NGN network.

Figure 1:
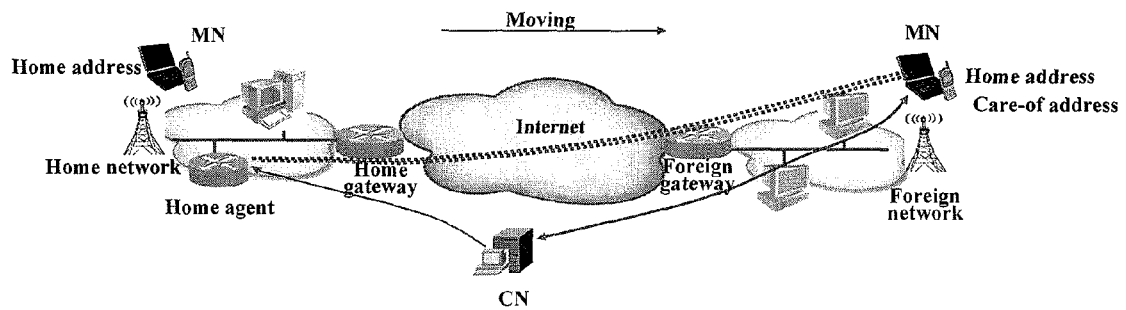
FIG. 1 is a schematic diagram of implementing MIP6.
Figure 2:
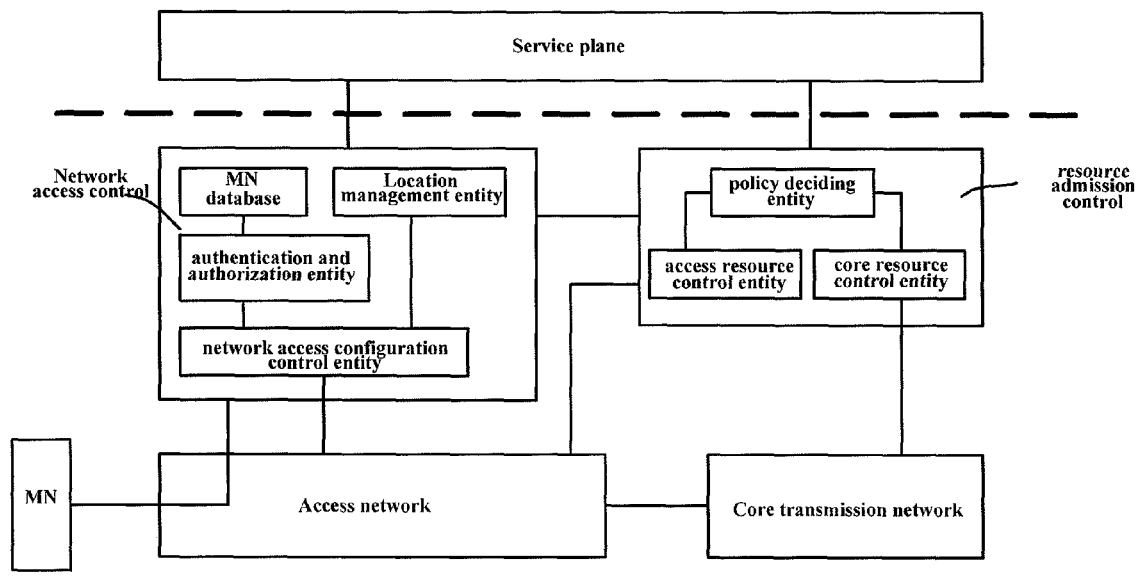
FIG. 2 is a schematic diagram showing the structure of NGN network.
Figure 3:
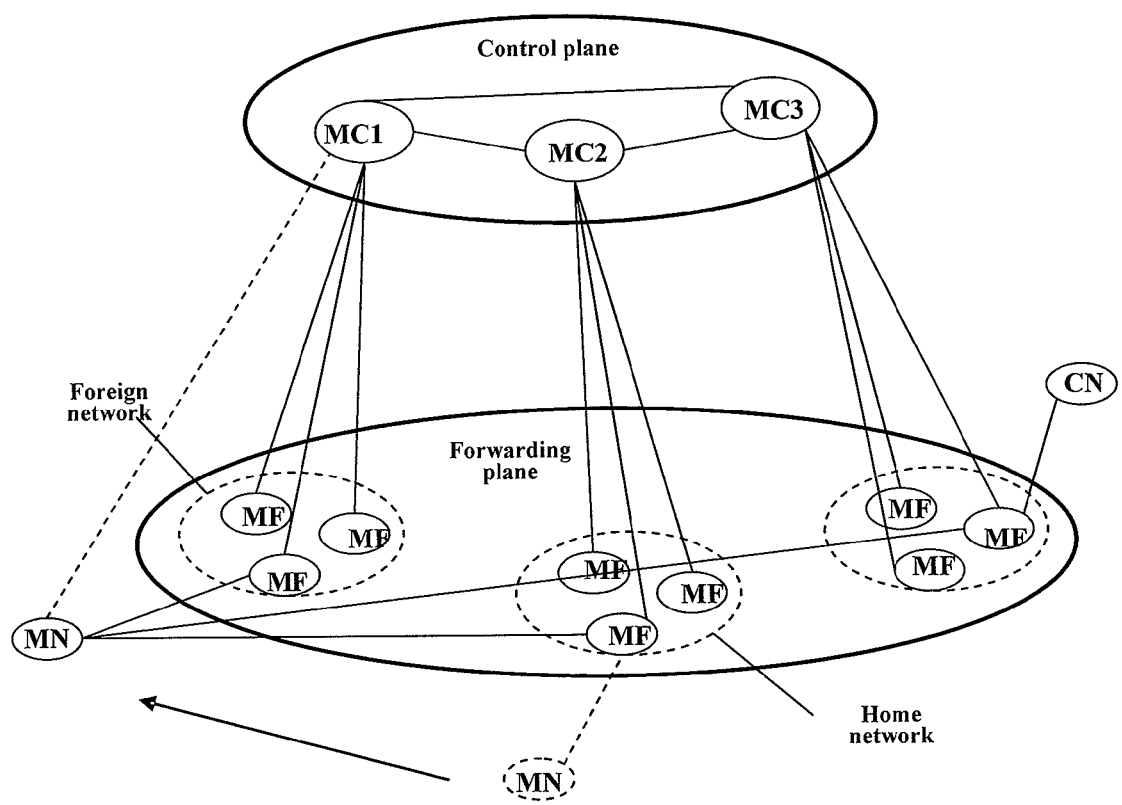
FIG. 3 is a schematic diagram showing the mobile IP management layered architecture according to an embodiment of the invention.

Referring to FIG. 3, a transmission network is mainly divided into two planes, a control plane and a forwarding plane. The control plane mainly controls the forwarding plane and implements functions such as access authentication of MN, MN management, resource control and quality of service (QoS); and the forwarding plane mainly implements packets processing and forwarding functions under the control of control plane. While in the mobile IP management, the mobility control entity and the mobility forwarding function entity are located in the control plane and the forwarding plane respectively. The mobility control entity and the mobility forwarding entity are logical entities independent of each other.

The mobility control (MC) entity is a core management entity of the mobile IP mechanism, which may be provided with the following functions:

(1) Controlling the mobility forwarding entity to implement related processing and correct forwarding of mobile IP packets.

(2) Being responsible for registration request from an MN when the MN undergoes location movement.

(3) Being responsible for maintenance and management of location information of MNs.

(4) Being responsible for maintenance and management of mapping relation between a care-of address and a home address of each MN.

(5) Providing security guarantee for mobility management.

The MC entity may control one or more local MF entities at the same time and is responsible for mobility management of the local network. Based on a registration request from an MN, the MC entity may select a corresponding MF entity for mobility management control. The MC entities in different areas can communicate with each other and exchange information to realize cross domain management of MNs. As shown in FIG. 3, the MC entities MC1, MC2 and MC3 belong to different network domains respectively and each manages and controls three MFs (not limited to three MFs).

An MN in a foreign network may register directly through a home MC entity, or indirectly through a foreign MC entity and the home MC entity.

The MF entity implements related processing and forwarding of mobile IP packets under the control of the MC entity. The MF entity may implement processing and forwarding of mobile IP packets by tunneling technology and route optimizing technology and provide the QoS assurance for the mobile IP packets.

The MN transmits and receives packets by forwarding and processing of a nearby MF entity; or the MN processes and forwards packets through the home MF entity; or the MN processes and forwards packets through an MF entity of the network the CN resides. The CN transmits and receives packets through forwarding and processing of a nearby MF entity.

If the network in which the CN resides has an MC entity and an MF entity, the MF entity may implement route optimization processing on the mobile IP packets under the control of the MC entity to which the MF entity belongs. At the same time, in order to ensure the privacy of the addresses of MNs, the MF entity may implement processing such as converting on headers of the mobile IP packets.

In practice, the MC entity and the MF entity may both be arranged in one physical entity and have identical IP address. Whether packets are signal or service data is identified by headers of the packets and the packets are transmitted to the MC entity and the MF entity. The MC entity and the MF entity may also be independent physical entities and have different IP addresses. Additionally, the MC entity and the MF entity may also be included in other different entities.

Figure 4:
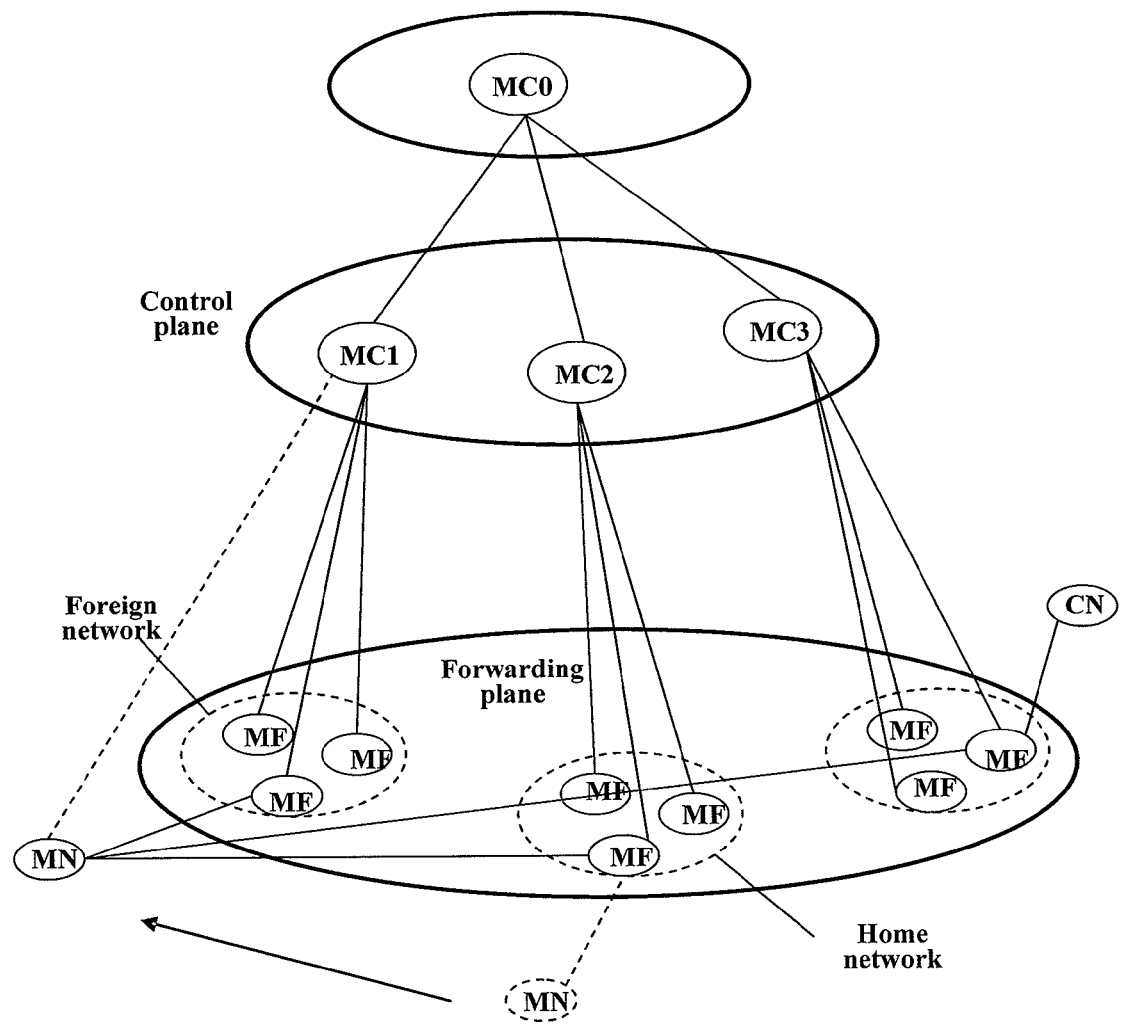
FIG. 4 is a structural representation of cascading of mobility control entity according to an embodiment of the invention.

For a simple network, the MC entities in different areas may be incorporated to be managed centrally. For a complex network, a plurality of MC entities may be managed hierarchically so that two or more layers of MC planes are used to realize mobility control management within a range. As shown in FIG. 4, MCI, MC2 and MC3 of different management domains are cascaded to MC0 that controls MC1, MC2 and MC3 centrally. In this structure, signal sent from an MN is first routed to MC0 and then forwarded by MC0 to a home MC entity of the MN.

Figure 5:
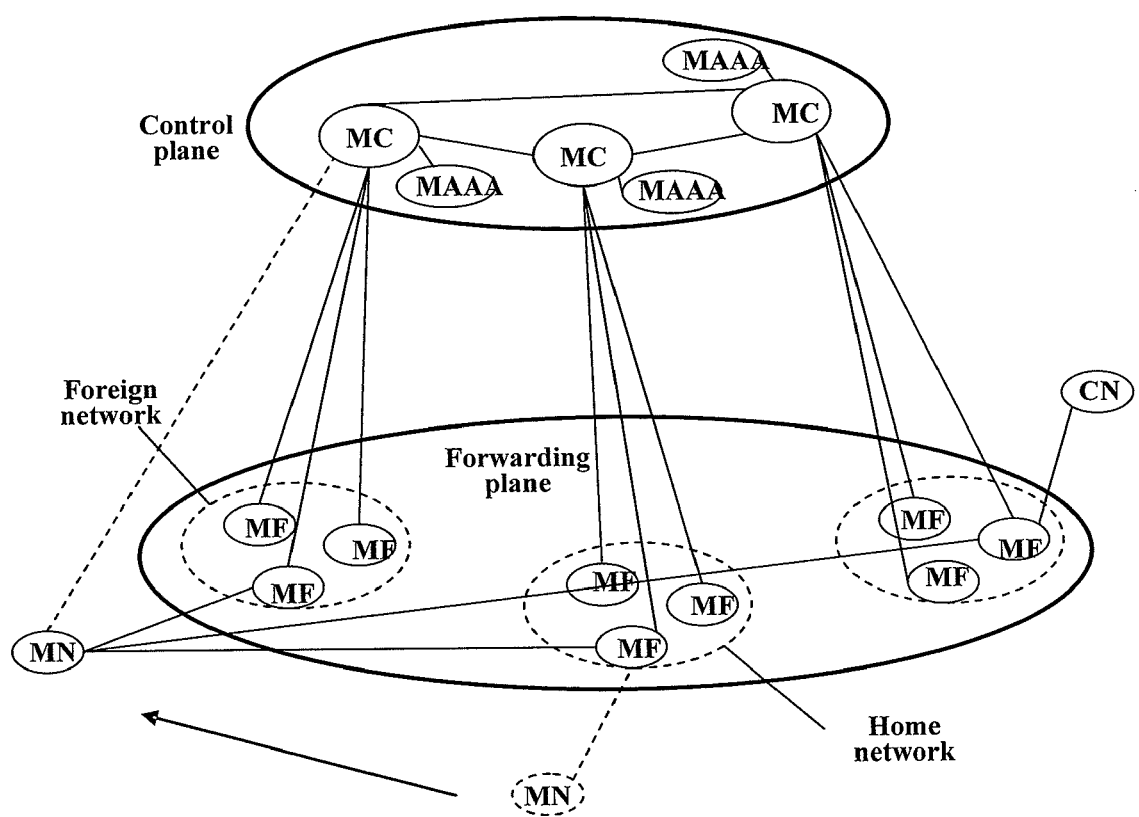
FIG. 5 is a schematic diagram showing the mobile IP management layered architecture with mobile AAA function according to an embodiment of the invention.

In order to further enhance security, a mobility authentication, authorization and accounting (MAAA) entity is added in the control plane. Referring to FIG. 5, an MAAA entity is connected to an MC entity to support authentication and accounting functions of mobile IP management. After an MC entity receives a registration request from an MN, the MC entity requests an MAAA entity to authenticate the MN and the MAAA entity returns a result to the MC entity after authentication.

After the control function and the forwarding function are separated in the mobile IP management, when an MN moves, the MN may automatically find nearby MF and MC entities and apply for mobile registration through the MC entity. At this point, the MN may also request its home MC entity directly for mobile registration.

Like the existing manners, an MN obtains a care-of address automatically from the foreign network when the MN moves, and the MN may exchange mobility signal with a CN to implement route optimization function. For the CN, it automatically searches for nearby MF and MC entities if the network where the CN resides has the nearby MC and MF entities.

In a network, mobility management for MNs mainly includes mobile registration, mobile switching and post-switching route optimization.

An MN registers with his home MC entity when the MN resides in the home NGN network. After the MN moves to a foreign network, the MN registers his identity with the home MC entity if the MN wants to use mobile services.

When an MN registers with a foreign network, the registration signal includes the MN's identity ID, password for using the mobile services and a new care-of address obtained in the visited network. In addition, the registration signal may be transmitted to the home MC entity via the foreign MC entity. In this case, the MN first searches for the foreign MF entity where the MN resides, and then acquires the address of the foreign MC entity where the MN resides based on the foreign MF entity.

In a network with the MAAA entity, the home MC entity of the MN further transmits the MN's identity ID and the password included in the registration signal to the home MAAA entity, and the home MAAA entity returns processing results to the home MC entity.

Figure 6:
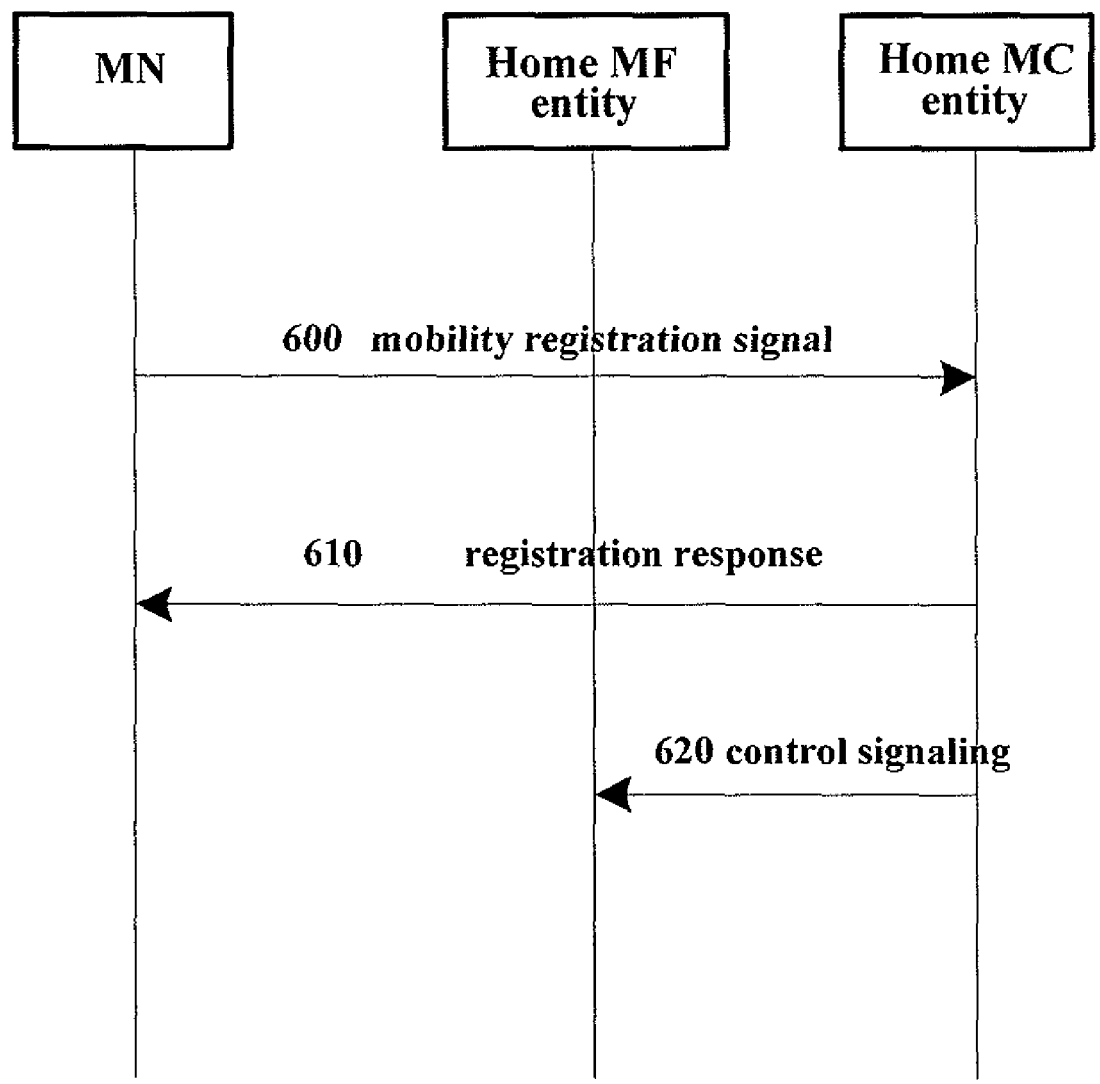
FIGS. 6 and 7 are flow diagrams showing registration of mobile node according to an embodiment of the invention.

Referring to FIG. 6, when an MN is in a foreign network, the registration procedure without authentication of MN is given as follows:

At step 600, the MN transmits a mobility registration signal (registration signal).

At step 610, the home MC entity registers the MN and returns a registration response to the MN.

At step 620, the MC entity transmits a control signal to the MF entity, to control the MF entity to process and forward mobile packets.

Figure 7:
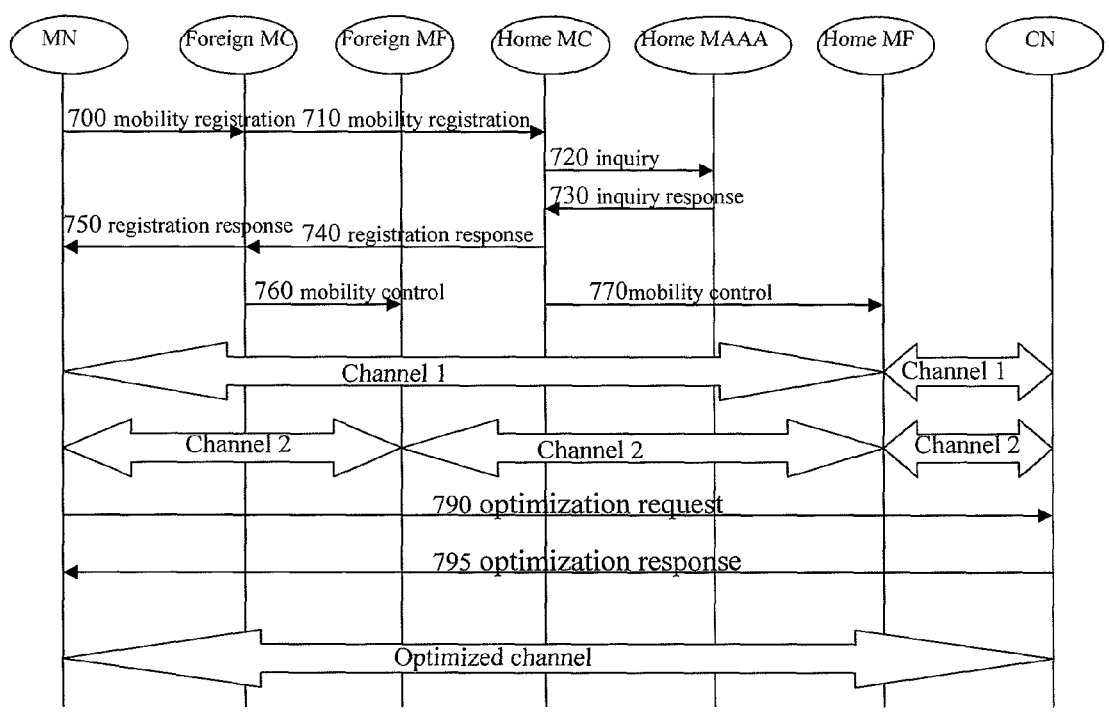

Referring to FIG. 7, when an MN is in a foreign network, the registration procedure with authentication of MN is given as follows:

At step 700, the MN automatically searches for the foreign MF entity, obtains the address of the foreign MC entity where the MN resides through the foreign MF entity, and transmits a mobility registration signal to the foreign MC entity.

At step 710, the foreign MC entity forwards the mobility registration signal to the home MC entity of the MN, wherein the mobility registration signal includes the home address and the care-of address obtained from the visited network of the MN.

At step 720, the home MC entity sends an inquiry signal to the MAAA entity upon receipt of the mobility registration signal.

At step 730, the MAAA entity authenticates the MN based the MN data and returns an inquiry response signal including an authentication result to the home MC entity.

At step 740, the home MC entity returns a registration response signal to the foreign MC entity.

At step 750, the foreign MC entity returns the registration response signal to the MN.

At step 760, the foreign MC entity transmits a mobility control signal to the corresponding foreign MF entity, to control the foreign MF entity to process and forward mobile packets.

At step 770, after finishing registration of the MN, the home MC entity sends a mobility control signal to the home MF entity, to control a corresponding foreign MF entity to process and forward packets.

If authentication of the MN is not required, the above procedure does not include the authentication at steps 720 and 730 and the home MC entity registers the MN directly with other processing intact.

At steps 700 and 710 of the above procedure, the MN may also transmit mobility registration signal directly to the home MC entity (namely step 710 not omitted).

After the MN is registered, a communication channel of the forwarding plane is established between the MN and the CN. The channel has two kinds of communication paths, one is that packets between the MN and the CN are forwarded by the home MF entity, whose route is similar to the communication mechanism of MIP6, and the other is that packets are forwarded by the home MF entity and the foreign MF entity, whose route is similar to the communication mechanism of MIP4. Which of the communication paths is selected depends on conditions of the network.

When an MN is located at a network boundary between a home network and a foreign network or between foreign networks, the MN applies the foreign network for a channel to the target access router, namely the care-of address. After that, the MN follows the mobile registration procedure, establishes a communication path with the CN after successful registration and communicates via the channel.

During switching procedure, the MC entity or other control entity in the network may further inquire MN data of the MN and send corresponding information on bandwidth, quality of service and the like to the MF entity for service control.

As shown in FIG. 7, when the MN performs point to point route optimization after switching, at step 790, the MN sends to the CN a optimization request message. The optimization request message includes a mapping relation between the home address and the latest care-of address of the MN, and the source address of the optimization request message is the latest care-of address of the MN. At step 795, the CN returns an optimization response to the MN and then communicates with the MN by using the latest care-of address of the MN.

Figure 8:
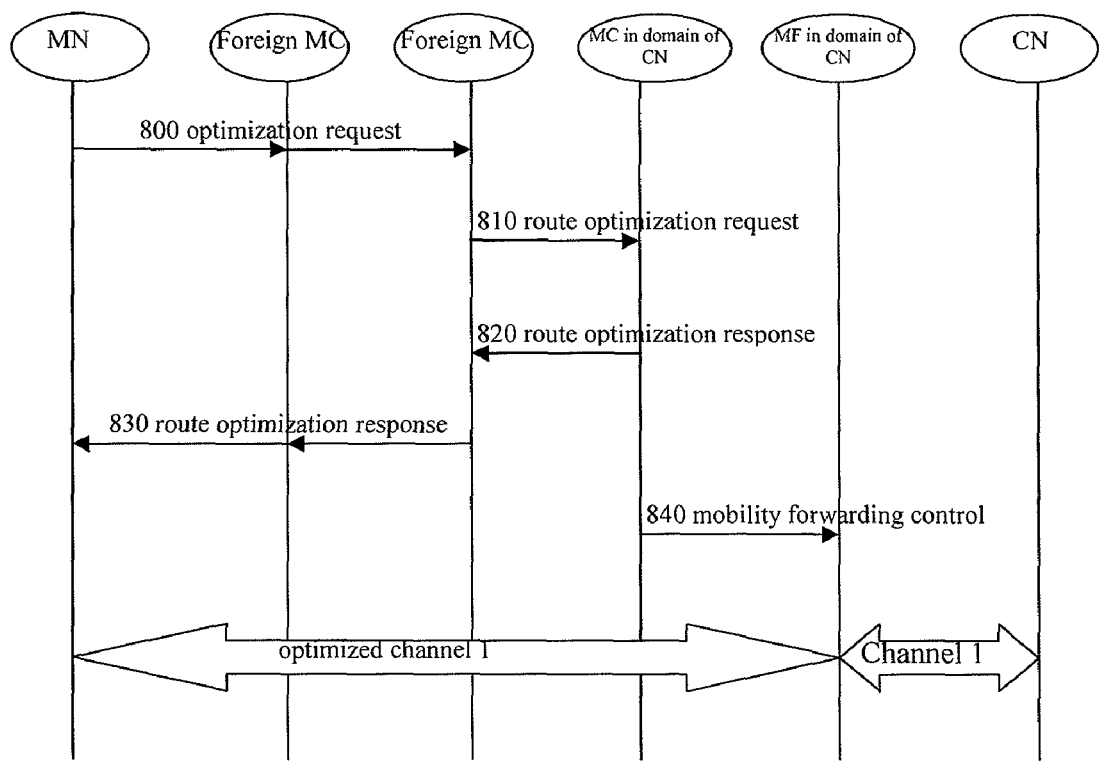
FIG. 8 is a flow diagram showing route optimization for mobile node according to an embodiment of the invention.

Referring to FIG. 8, the MN and the CN can also implement route optimization by the following procedure:

At step 800, the MN sends a route optimization request signal to the home MF entity.

The MN may send the route optimization request signal to the home MF entity directly, or request the home MC entity indirectly via a foreign MC entity.

At step 810, the home MC entity sends the route optimization request signal to the MC entity in the domain of the CN after approving the route optimization request from the MN.

At step 820, the MC entity in the domain of the CN returns a route optimization response signal to the home MC entity after receiving the route optimization request signal.

At step 830, the home MC entity delivers the final route optimization response result to the MN.

The return route is reverse to the route through which the route optimization request signal is sent at step 800.

At step 840, after approving the route optimization response signal, the MC entity in the domain of the CN transmits a mobility forwarding control signal to the MF entity adjacent to the CN, to control the MF entity to process and forward mobile packets.

So far, an optimized communication channel is established between the MN and the CN. All mobile packets are forwarded via the MF entity in the domain of the CN and packets from the CN to the MN are intercepted by the MF entity and sent directly to the MN via the shortest route, which avoids the "triangle route" problem of mobile IP mechanism.

In order to protect the privacy of the address of the MN, after packets from the MN to the CN are intercepted by the MF entity in the domain of the CN, the source IP address (i.e. the care-of address of the MN) of the packets is replaced with the home address of the MN, and the packets are forwarded to corresponding MN after being performed packet encapsulation processing.

A specific implementation of the present invention will be described below by taking support of mobility management in NGN network as an example.

The present embodiment adds function entities for mobility management into the control part and the forwarding part in the transmission layer of the existing NGN network system to implement mobility management, particularly mobility management identical to MIP6 technology for MNs by cooperating between the added function entities and the existing function entities.

Figure 9:
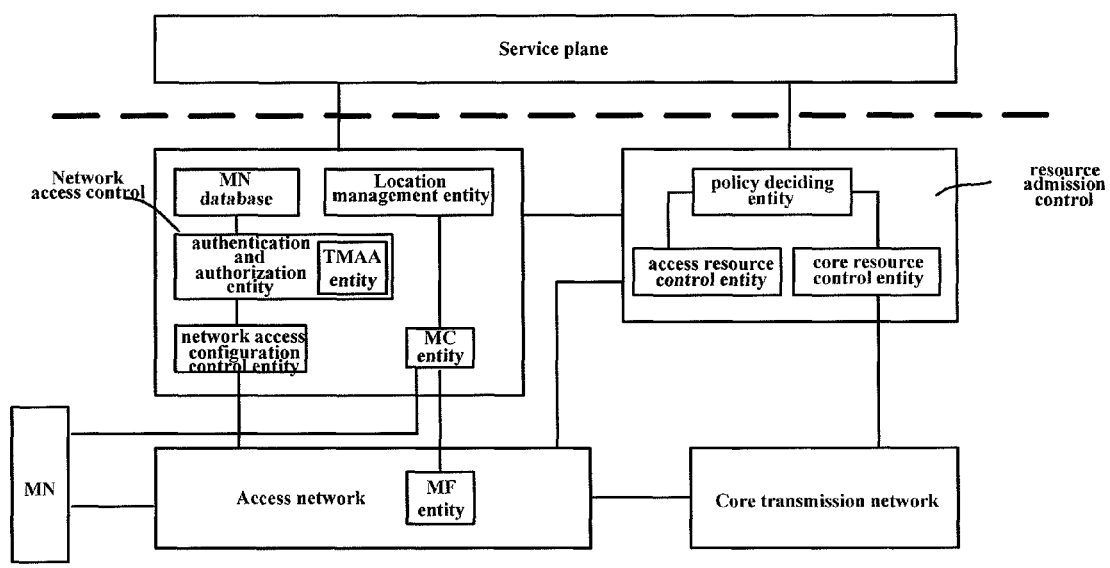
FIG. 9 is a structural representation showing an NGN network that supports mobility management according to an embodiment of the invention.

Referring to FIG. 9, in addition to the existing use database, authentication and authorization entity (TAA), network access configuration control function entity and location management entity, an MC entity is added to the control function entity of the NGN network transmission layer; and an MF entity is added to the forwarding control function entity, thereby separating the control function and the forwarding function of mobility management and complete fusion with the NGN network.

The MC entity mainly performs processing of signal with MNs, registration processing and some agent functions.

Because newly added function entities will influence control entities of the service layer such as call and answer, the MC entity reports location information to the location management entity and in turn the location management entity reports the location information to service control related entities in the service plane of the NGN network.

The MF entity mainly performs encapsulating and forwarding of mobile service related packets and may reside in the access transmission network and/or the core transmission network of the forwarding layer. When the MF entity is configured in the core transmission network, it is located at the edge of the core network.

Signal sent by an MN may be passed to the MC entity through the MF entity, and may also be passed to the MC entity through other function entities in the NGN network. The MC entity transmits a processing result to the MF entity. In practical implementation, the MC entity and the MF entity may be one and the same physical entity and may also be two independent physical entities.

In order to enhance security, a mobility authentication and authorization (TMAA) entity is further added in the control function entity of the NGN network, which authenticates and authorizes MNs by inquiring MN information in the MN database (TUP). An agreement relation needs to be established between the TMAA entity and the authentication and authorization entity (TAA), and the MC entity communicates with the TMAA entity to acquire the authentication and authorization result.

There are communication interfaces between the MC entity, the MF entity and function entities in the resource admission control function of the transmission layer, the function entities in the resource admission control function performs application, control, scheduling and releasing of resources for the MC entity and the MF entity. If the MF entity resides in the access network, the access network resource control entity performs application, control, scheduling and releasing of resources for the MF entity. If the MF entity resides in the core network, the core network resource control entity or the core network resource control entity in combination with the MC entity perform application, control, scheduling and releasing of resources for the MF entity.

After function entities for mobility management are added in the NGN network, mobility management may be conducted for MNs. The mobility management mainly includes mobility registration and mobility switching.

An MN is required to register with the home authentication and authorization entity when the MN is in the home NGN network. When moving into a foreign network, the MN is required to register his identity with the authentication and authorization entity of the visited NGN network, and when the authentication and authorization entity of the visited network authenticates the MN and returns a registration response to the MN, the MN determines whether he can access the visited network based on the result of the registration response.

If the MN wants to use mobile services after accessing the foreign network, the MN is required to register his identity with his home function entity for mobility management. The registration message includes the MN's identity ID, a password for using mobile services and the MN's new care-of address obtained in the visited network. The registration message is first transmitted from the MN to the MF entity, the MF entity encapsulates and transmits the registration message to the MC entity, and the MC entity transmits the MN's identity ID and the password in the registration message to the mobile AAA entity; and the mobile AAA entity transmits a processing result in a reverse order to the MN. In this authentication procedure, the MC entity also transmits an inquiry request to the access network resource control entity to determine whether there are enough resources for accommodating the MN and carries the determination result in the registration response. The MN can determine whether he can use the home mobile communication services according to the registration response.

Figure 10:
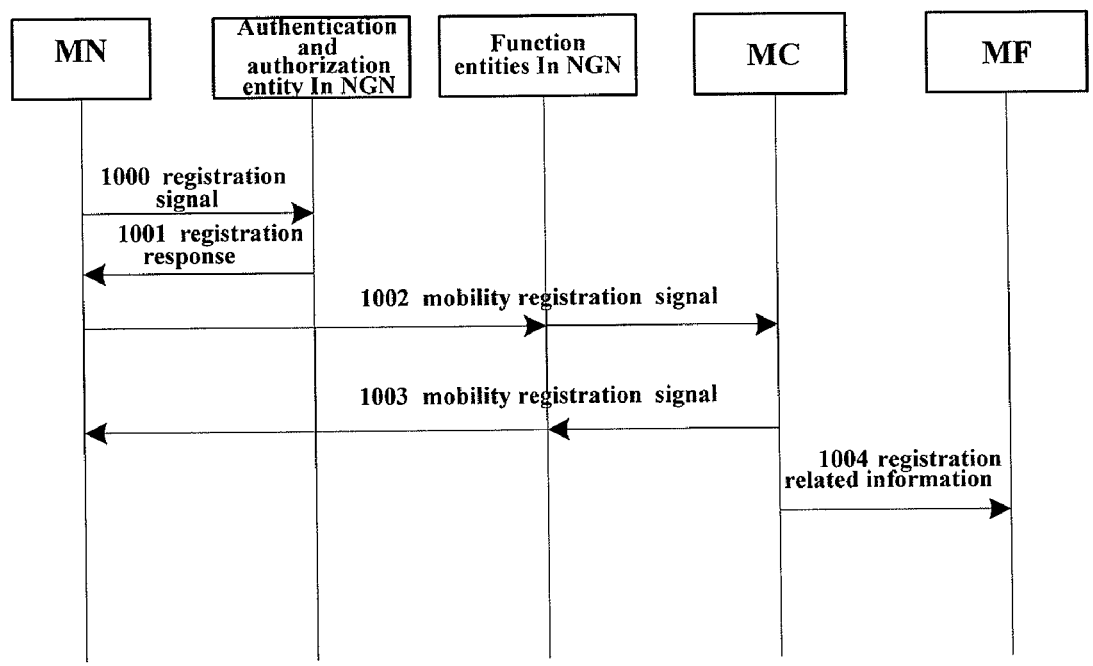
FIGS. 10 and 11 are flow diagrams showing mobile node's registration in an NGN network according to an embodiment of the invention.

According to security requirements, an MN may not be authenticated during the registration procedure. With reference to FIG. 10, the registration procedure in this case is given below:

At step 1000, the MN sends a registration signal to a server in the NGN network to request for accessing the NGN network. If the MN is in a foreign network, the registration signal is sent to the visited network.

At step 1001, the server registers the MN and returns a registration response signal to the MN.

At step 1002, after the MN is registered successfully, the MN sends a mobility registration signal, the mobility registration signal being transmitted to the MC entity via function entities in the NGN network.

At step 1003, the MC entity registers the MN and returns a registration response to the MN.

At step 1004, the MC entity transmits the MF entity related information after the MN is registered.

In the procedure of FIG. 10, the mobility registration signal sent by the MN may also be transmitted to the MF entity, and the MF entity transmits the mobility registration signal to the MC entity. Because the registration procedures are the same, the detailed description is omitted.

For an MN that wants to establish a session, a communication channel may be established in the forwarding plane between the MN and a CN after the mobile registration of the MN is successful.

Figure 11:
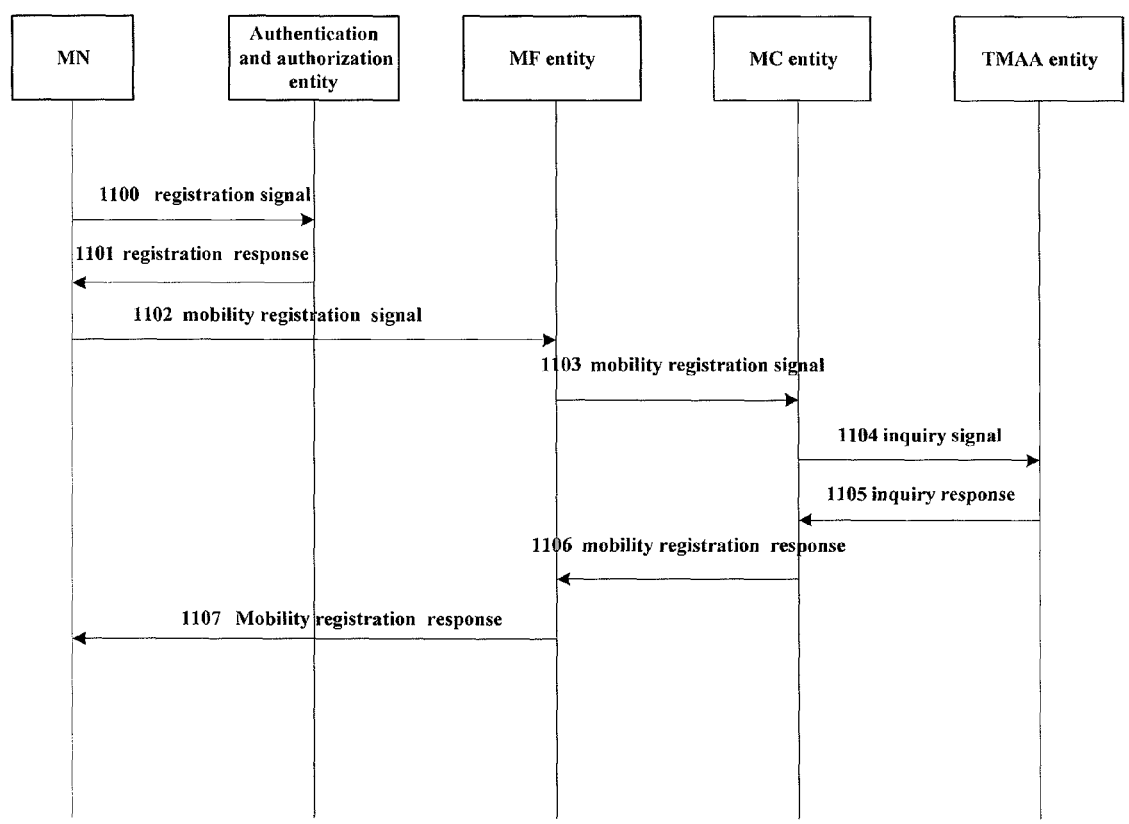

In order to enhance security, an MN r may be authenticated during the mobile registration procedure. With reference to FIG. 11, the mobile registration procedure in this case is given below:

At step 1100, the MN sends a registration signal to the authentication and authorization entity (server) in the NGN network to request for accessing the NGN network. If the MN is in a foreign network, the registration signal is sent to the visited network.

At step 1101, the authentication and authorization entity acquires MN data from the MN database to authenticate the MN, and transmits a corresponding registration response to the MN based on the authentication result.

At step 1102, the MN sends a mobility registration signal to the MF entity in the NGN network after the MN is registered successfully.

At step 1103, the MF entity forwards the received mobility registration signal to the MC entity.

At step 1104, the MC entity sends an inquiry command to the mobility authentication and authorization entity after receiving the mobility registration signal from the MN.

At step 1105, the mobility authentication and authorization entity acquires MN data from the MN database to authenticate the MN, and transmits the authentication result to the MC entity.

At step 1106, the MC entity transmits different registration response messages to the MF entity based on different authentication results.

At step 1107, the MF entity returns a registration response to the MN.

In the procedure of FIG. 11, the MN may also transmits the mobility registration signal to other function entities in the NGN network and the mobility registration signal is passed to the MC entity, referring to FIG. 10 for its mobile registration procedure.

For an MN that wants to establish a session, a communication channel may be established in the forwarding plane between the MN and a CN after the mobile registration is successful.

When a mobile user is at the network boundary between the home network and the foreign network or at the network boundary between foreign networks, the link layer reports a switching event to the network. After receiving the switching event, the network layer of the MN transmits an agent route request to the current access router, to acquire information on adjacent access routers. When the MN acquires the address of the access router which the MN will access, the MN subjects to identity authentication or authorization by the authentication and authorization entity to which the access router belongs (if the authentication and authorization domain to which the access router belongs is the same as that before switching, the authentication process is not required). After acquiring authorization, the MN sends a switching request to the current access router, and the current access router processes the switching request and sends a switching initialization message to a target access router; the target access router authenticates the switching initialization message after receiving it and returns a response to the current access router of the MN; and the current access router sends the authentication result to the MN. If the MN receives a response indicating that the switching is successful, the MN obtains a channel to the target access router.

After this, the MN follows the mobile registration procedure. The registration message sent from the MN to the home mobile service entity includes the care-of address currently obtained from the visited network and the home address of the MN. If the authentication of the MN is successful, the MC entity establishes therein a mapping relation between the care-of address and the home address of the MN and transmits the mapping relation to the MF entity. If an old mapping relation between the care-of address and the home address of the MN is stored in the MC entity, the MC entity and the MF entity deletes the old mapping relation. After the MF entity has established the mapping relation between the home address and the care-of address, the function entities of the resource admission control function further inquire MN data of the MN and transmit corresponding information on bandwidth, quality of service and so on to the MF entity.

Thus, a communication channel via the MF entity is established between the MN and the CN: a communication message having subject to tunneling encapsulation is sent to the MF entity; the MF entity removes the tunneling encapsulation of the communication message and sends the communication message to the CN; and a message from the CN undergoes a reverse procedure.

After the new communication channel is established, the old communication channel between the MN and the CN is disabled immediately and the new communication channel is enabled, thereby completing the mobile switching.

After the MN completes the mobile switching, a long-path communication channel via the MF entity of the home network is established between the MN and the CN. When the MN roams to a foreign network, there is possibly a direct shorter path between the MN and the CN that doesn't pass the MF entity. Therefore, in order to optimize the path, after completing the mobile switching, the MN sends to the CN a route optimization request that includes the mapping relation between the home address and the latest care-of address of the MN and has the latest care-of address as its source address. After receiving the route optimization request, the CN stores the mapping relation included in the route optimization request, deletes the old mapping relation and sends a route optimization response to the MN if the CN accepts the route optimization request. Thus, a communication channel having subject to route optimization is established between the MN and the CN; the destination address of messages sent by the MN is the address of the CN and the destination address of messages sent by the CN is the latest care-of address of the MN; and thus the two parties can communicate without switching the home MF entity of the mobile user.

Figure 12:
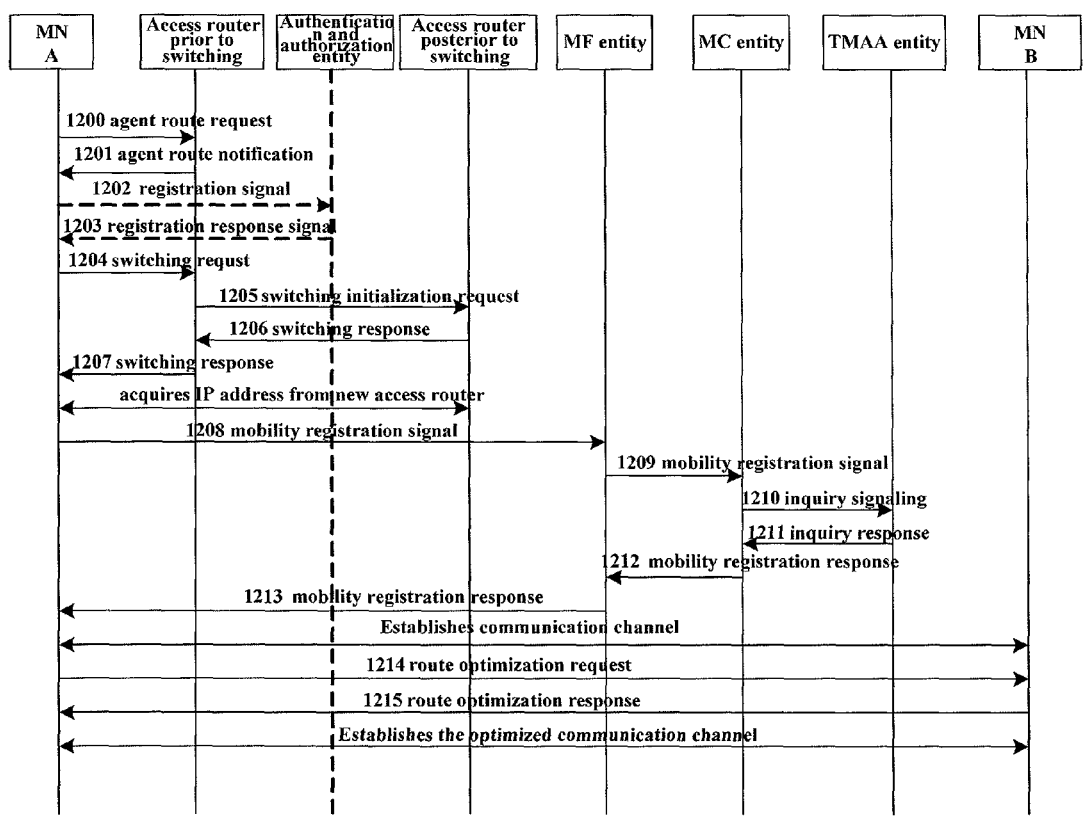
FIG. 12 is a flow diagram showing switching and optimizing communication channels in NGN network according to an embodiment of the invention.

Referring to FIG. 12, the procedure by which an MN switches from the home network to a foreign network and optimizes the communication route is given below (taking the case that authentication is required during registration and the registration is successful as an example):

At step 1200, an MN A in the NGN network sends an agent route request to the current access router.

At step 1201, the current access router returns an agent route notification to the MN A.

At step 1202, the mobile terminal A sends a registration signal to an authentication and authorization entity (server) in the NGN network, to request for accessing the NGN network. If the MN A is in a foreign network, the MN A sends the registration signal to the visited network.

At step 1203, the authentication and authorization entity acquires MN data from the MN database to authenticate the MN, and transmits a corresponding registration response signal to the MN A if the authentication of the MN is successful (if the authentication and authorization domains to which the current access router and the target access router belong are the same, steps 510 and 515 is not required as indicated as dotted line in the figure).

At step 1204, the MN A transmits a switching request to the current access router.

At step 1205, the current access router sends a switching initialization request to the target access router.

At step 1206, the target access router returns a switching response to the current access router.

At step 1207, the current access router returns a switching response to the MN A and thus the MN A acquires IP address (namely the care-of address) from the target access router.

At step 1208, the MN A transmits a mobility registration signal to the MF entity in the NGN network, wherein the mobility registration signal includes the care-of address currently obtained from the visited network and the home address of the MN.

At step 1209, the MF entity forwards the received mobility registration signal to the MC entity.

At step 1210, the MC entity sends an inquiry signal to the mobility authentication and authorization entity after receiving the mobility registration signal from the MN A.

At step 1211, the mobility authentication and authorization entity acquiring MN data from the MN database to authenticate the MN, the authentication of the MN is successful, and transmits the authentication result to the MC entity.

At step 1212, the MC entity sends a registration response to the MF entity, and meanwhile, the MC entity establishes therein a mapping relation between the care-of address and the home address of the MN and transmits the mapping relation to the MF entity.

At step 1213, the MF entity returns the registration response to the MN and the MN A establishes a communication channel with the CN B through the target router.

At step 1214, the MN A transmits the CN B an optimization request, which includes the mapping relation between the home address and latest care-of address of the MN A and has the latest care-of address as its source address.

At step 1215, the CN B returns an optimization response to the MN A; and then the two parties communicate through the optimized communication channel.

As described above, the present invention has the following features:

(1) Because the present invention separates the mobility management control layer from the mobility management forwarding layer, this kind of mobility management is suitable for the hierarchical control network structure model.

(2) Capability of providing universal mobility in the hierarchical control network for a mobile object.

(3) Capability of being compatible with existing mobile IPv6 and mobile IPv4 mechanism.

(4) Supporting for characteristic management of MNs and capability of accessing service characteristics of MNs from anywhere of the network (the home network or the visited network) to facilitate functions such as authentication, authorization, service provision and accounting.

(5) Supporting for network mobility of MN and supporting for service continuity when the MN is roaming.

(6) Capability of ensuring switching safety and preventing illegal access and protecting privacy of MNs.

(7) Supporting for the mobility of VPN MN.

(8) Capability of providing address management function for MNs and supporting for functions such as mobile registration, location update and address conversion of MNs.

(9) Supporting for characteristic management of a mobile device, and capability of acquiring current location of the MN, address of the MN, the user to which the MN belongs, and wireless resource conditions of the MN from anywhere.

(10) Capability of preventing locations of MNs from being acquired by a third party.

(11) Addressing the "triangle route" problem of mobile IP by combining multiple solutions and providing multiple route optimization manners.

Obviously, those skilled in the art may make various changes and modifications to the present invention without departing from the spirit and scope of the present invention. The present invention is thus intended to include these changes and modifications if they are within the scope of the claims and their equivalents.

What is claimed is:

1. A network system for realizing mobile IP management, comprising: a control function entity and a forwarding function entity of a transmission layer, the forwarding function entity performing service forwarding under the control of the control function entity; the control function entity of the transmission layer comprises a mobility control entity and the forwarding function entity comprises a mobility forwarding entity; wherein the mobility control entity is configured to process signal sent from a mobile node and transmit a processing result to the mobility forwarding entity; and the mobility forwarding entity is configured to encapsulate/decapsulate and forward mobile service related packets under the control of the mobility control entity;

wherein a registration signal is directly transmitted to a home mobility control entity when the mobile node is in a foreign network, or the sent registration signal is transmitted to the home mobility control entity via a foreign mobility control entity of a foreign network where the mobile node resides when the mobile node is in the foreign network;

when the mobile node is in the foreign network, a route optimization request is transmitted to the home mobility control entity by the mobile node after the mobile node completes the switching and the route optimization request is transmitted to a mobility control entity in which the correspondent node resides after the route optimization request is approved; and an optimized communication channel is established after the mobile node receives a route optimization response, and packets are forwarded by a mobility forwarding entity in which the correspondent node resides, and the mobile node acquires a care-of address from the foreign network prior to sending a mobility registration signal when the mobile node switches registration, and carries the care-of address in the mobility registration signal;

the mobility control entity is further configured to acquire information on quality of service of the mobile node and applies the information to service control during the switching.

2. The network system of claim 1, wherein the control function entity of the transmission layer further comprises:

a mobility authentication and authorization entity configured to implement authorization, authentication and accounting for a mobile node based on a request from the mobility control entity.

3. The network system of claim 1, wherein the mobility control entity and the mobility forwarding entity are logical entities independent of each other.

4. The network system of claim 3, wherein one mobility control entity is connected to a plurality of mobility forwarding entities and controls the plurality of mobility forwarding entities.

5. The network system of claim 1, wherein there are a plurality of mobility control entities interconnected or a plurality of mobility control entities that are cascaded.

6. The network system of claim 1, wherein the mobility control entity and the mobility forwarding entity are arranged in one physical entity, the mobility control entity and the mobility forwarding entity are included in other different entities, or the mobility control entity and the mobility forwarding entity are physical entities independent from each other.

7. The network system of claim 1, wherein the mobility forwarding entity is further connected to an access network resource control entity in the control function entity of the transmission layer, and the access network resource control entity provides resource control for the mobility forwarding entity, the network system is an NGN network system, and the mobility forwarding entity is arranged in an access network of the transmission layer.

8. The network system of claim 1, wherein the mobility forwarding entity is arranged in a core network of the transmission layer and located at an edge of the core network, the network system is an NGN network system, and the mobility forwarding entity is further connected to a core network resource control entity in the control function entity of the transmission layer, and the core network resource control entity provides resource control for the mobility control entity.

9. The network system of claim 1, wherein the mobility forwarding entity is arranged in an access network and a core network of the transmission layer respectively;

the mobility forwarding entity arranged in the access network is connected to an access resource control entity in the control function entity of the transmission layer and the access resource control entity provides resource control for the mobility forwarding entity in combination with the mobility control entity; and the mobility forwarding entity arranged in the core network is connected to a core network resource control entity in the control function entity of the transmission layer and the core network resource control entity provides resource control for the mobility forwarding entity in combination with the mobility control entity; and the network system is an NGN network system.

10. The network system of claim 1, wherein the control function entity of the transmission layer comprises an authentication and authorization entity configured to provide access authorization for an NGN mobile node; the mobility authentication and authorization entity and the authentication and authorization entity are arranged independently from each other and interact via an external interface, or the authentication and authorization entity and the mobility authentication and authorization entity are incorporated into a whole and interacts via an internal interface, and the network system is an NGN network system.

11. The network system of claim 1, wherein a signal sent by a mobile node is passed to the mobility control entity via the mobility forwarding entity, or to the mobility control entity via other function entities in the NGN network system, and the network system is an NGN network system.

12. A method for realizing mobile IP management, comprising:

sending, by a mobile node, a mobility registration signal to a mobility control (MC) entity in a control function entity of a transmission layer of a network;

registering the mobile node, returning a registration response to the mobile node and transmitting a control signal to a mobility forwarding (MF) entity in the transmission layer by a home mobility control entity of the mobile node; and controling, by the mobility control entity, the mobility forwarding entity after the mobility control entity receives a request signal from the mobile node, to provide communication services for the mobile node;

transmitting directly the sent mobility registration signal to the home mobility control entity when the mobile node is in a foreign network, or transmitting the sent mobility registration signal to the home mobility control entity via a foreign mobility control entity of a foreign network where the mobile node resides when the mobile node is in the foreign network;

when the mobile node is in the foreign network, transmitting a route optimization request to the home mobility control entity by the mobile node after the mobile node completes the switching and transmitting the route optimization request to a mobility control entity in which the correspondent node resides after the route optimization request is approved; and establishing an optimized communication channel after the mobile node receives a route optimization response and forwarding packets by a mobility forwarding entity in which the correspondent node resides;

acquiring a care-of address from the foreign network by the mobile node prior to sending a mobility registration signal when the mobile node switches registration, and carrying the care-of address in the mobility registration signal;

acquiring information on quality of service of the mobile node and applying the information to service control by the mobility control entity during the switching.

13. The method of claim 12, further comprising:
transmitting, by the home mobility control entity, an authentication request to a home mobility authentication and authorization entity after the home mobility control entity receives the mobility registration signal; and
authenticating the mobile node and returning a authentication result to the mobility control entity by the mobility authentication and authorization entity.

14. The method of claim 12, further comprising: acquiring automatically a nearby foreign mobility forwarding entity and further acquiring an address of a foreign mobility control entity based on the nearby foreign mobility forwarding entity by the mobile node when the mobile node is registered in a foreign network.

15. The method of claim 12, further comprising: transmitting a route optimization request to a correspondent node by the mobile node after the mobile node completes the switching and establishing an optimized communication channel with the correspondent node by the mobile node after the mobile node receives a route optimization response.

16. The method of claim 12, further comprising: processing the care-of address of the mobile node in the packets sent by the mobile node by the mobility forwarding entity in which the correspondent node resides after the mobility forwarding entity receives the packets, to protect privacy of the location of the mobile node.

17. A method for realizing mobility management in a NGN network system, comprising steps of:
transmitting a registration message to the NGN network by a mobile node, and registering the mobile node and returning a registration response to the mobile node by a function entity for registration in the NGN network;
transmitting a mobile registration message to the NGN network by the mobile node after the mobile node receives a successful registration response, and registering the mobile node and returning a registration response to the mobile node by a home function entity for mobility management of the user in the NGN network; and
providing corresponding communication services base on a request from the mobile node by the function entity for mobility management in the NGN network after the mobility registration of the mobile node is successful;
transmitting directly the sent mobility registration signal to a home mobility control entity when the mobile node is in a foreign network, or transmitting the sent mobility registration signal to the home mobility control entity via a foreign mobility control entity of a foreign network where the mobile node resides when the mobile node is in the foreign network;
when the mobile node is in the foreign network, transmitting a route optimization request to the home mobility control entity by the mobile node after the mobile node completes the switching and transmitting the route optimization request to a mobility control entity in which the correspondent node resides after the route optimization request is approved; and establishing an optimized communication channel after the mobile node receives a route optimization response and forwarding packets by a mobility forwarding entity in which the correspondent node resides;

acquiring a care-of address from the foreign network by the mobile node prior to sending a mobility registration signal when the mobile node switches registration, and carrying the care-of address in the mobility registration signal;

acquiring information on quality of service of the mobile node and applying the information to service control by the mobility control entity during the switching.

18. The method of claim 17, further comprising: authenticating the mobile node requesting for registration based on mobile node data by the function entity for registration in the NGN network; or/and further performing mobility authentication for the mobile node based on the mobile node data by the function entity for mobility management.

19. The method of claim 17, further comprising: inquiring information on resource by a corresponding function entity in the NGN network during the registering, to determine whether there are enough resources for accomodating the mobile node.

20. The method of claim 17, further comprising: transmitting a agent route request and a switching request to a current access router and a target access router in the NGN network respectively by the mobile node prior to transmitting the mobile registration message, to acquire a care-of address.

21. The method of claim 20, further comprising: carrying the care-of address currently acquired from the visited network in the transmitted mobile registration message by the mobile node.

22. The method of claim 21, further comprising: establishing a mapping relation between the care-of address and the home address of the mobile node by the function entity for mobility management in the NGN network after the mobility registration of the mobile node is successful.

23. The method of claim 22, further comprising: deleting an existing mapping relation between the care-of address and the home address by the function entity for mobility management in the NGN network.

24. The method of claim 17, further comprising: sending, by the mobile node, a route optimization request to a correspondent node after the mobile node completes the switching, the route optimization request comprising the mapping relation between the care-of address and the home address and the care-of address being the source address of the route optimization request; and storing the mapping relation between the care-of address and the home address and transmitting a route optimization response with the care-of address as the destination address by the correspondent node, to establish an optimized communication channel.

25. The method of claim 18, further comprising: transmitting a agent route request and a switching request to a current access router and a target access router in the NGN network respectively by the mobile node prior to transmitting the mobile registration message, to acquire a care-of address.

26. The method of claim 19, further comprising: transmitting a agent route request and a switching request to a current access router and a target access router in the NGN network respectively by the mobile node prior to transmitting the mobile registration message, to acquire a care-of address.

* * * * *

UNITED STATES PATENT AND TRADEMARK OFFICE
CERTIFICATE OF CORRECTION

PATENT NO. : 8,300,631 B2  
APPLICATION NO. : 12/163694  
DATED : October 30, 2012  
INVENTOR(S) : Xianfeng Dai Page 1 of 1

It is certified that error appears in the above-identified patent and that said Letters Patent is hereby corrected as shown below:

Column 16, line 49, "controling" should read -- controlling --.

Column 17, line 13, "transmiting" should read -- transmitting --.

Column 17, line 38, "a NGN" should read -- an NGN --.

Column 18, line 27, "a agent" should read -- an agent --.

Signed and Sealed this
Second Day of April, 2013

Teresa Stanek Rea
*Acting Director of the United States Patent and Trademark Office*